Nov. 18, 1924.   1,515,681
H. W. HILL
LENS GRINDER
Filed May 2, 1919   4 Sheets-Sheet 1
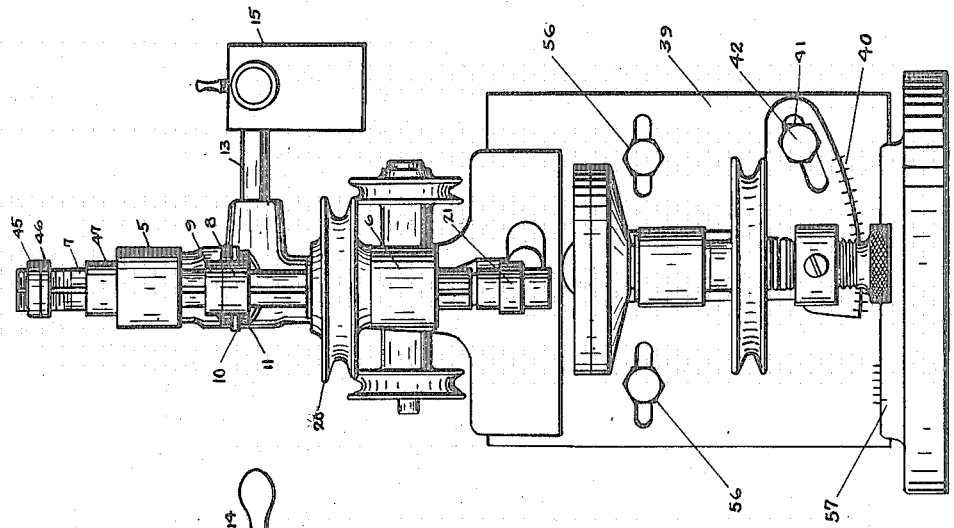
FIG. II
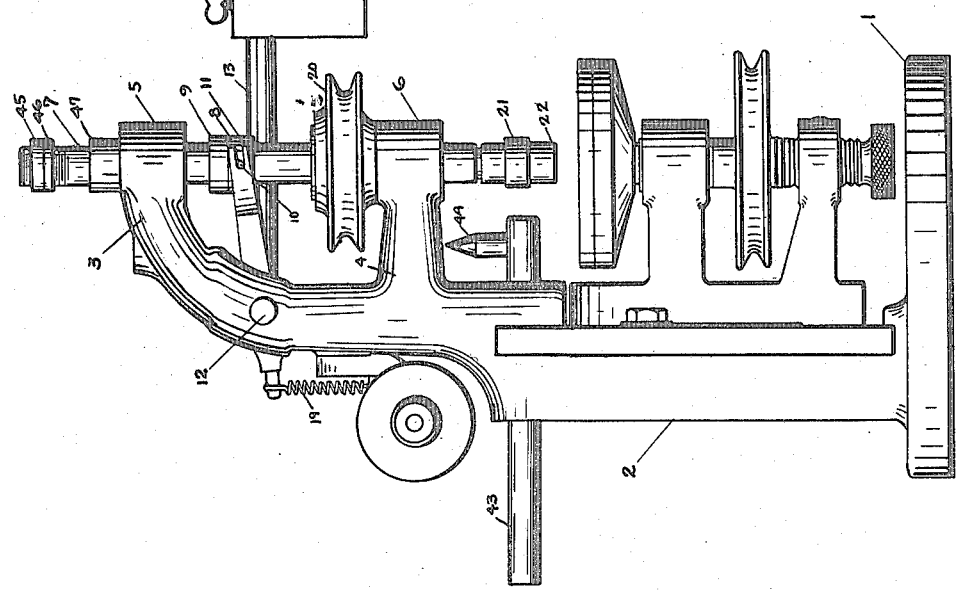
FIG. I
INVENTOR
HARRY W. HILL
BY
H. H. Styll & H. H. Parsons
ATTORNEYS

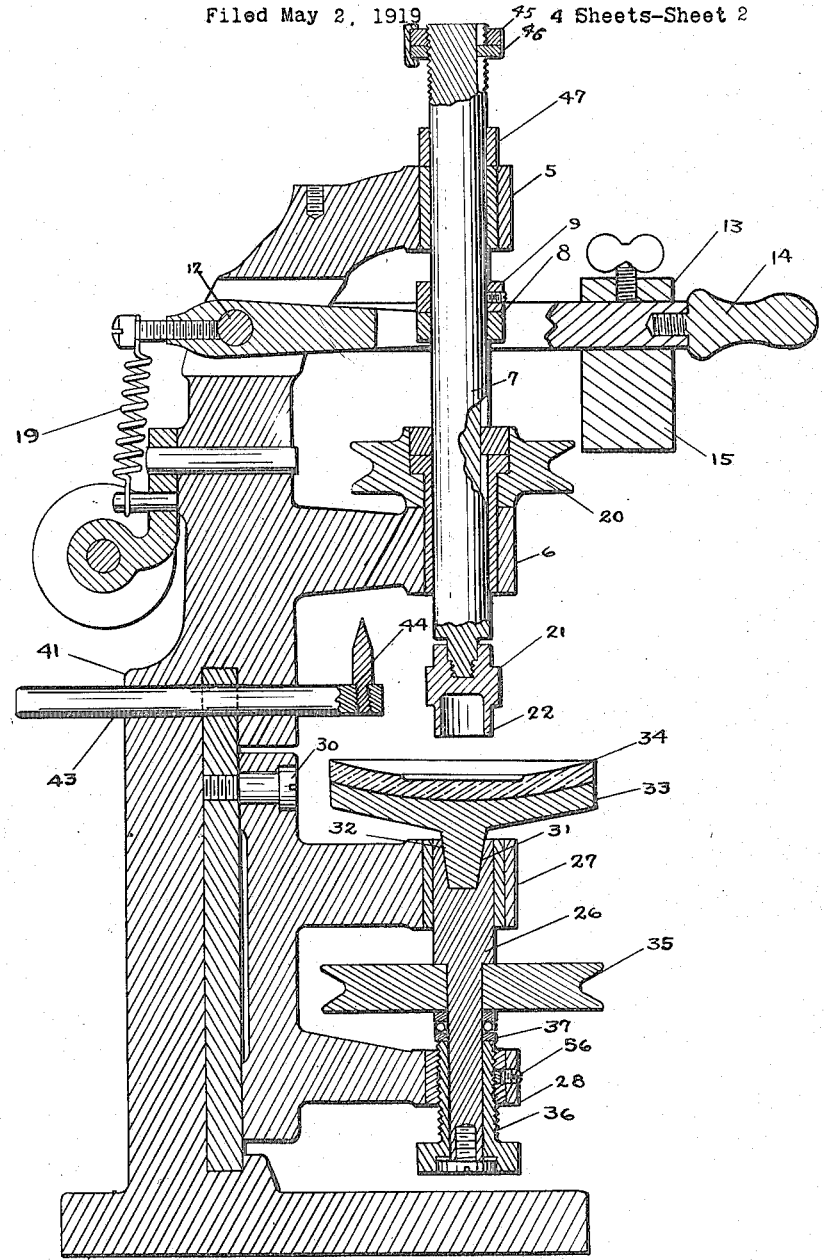
FIG. III

Nov. 18, 1924.
H. W. HILL
LENS GRINDER
Filed May 2, 1919     4 Sheets-Sheet 3
1,515,681
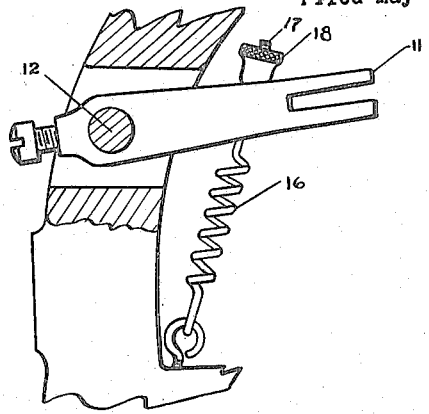
FIG. IV
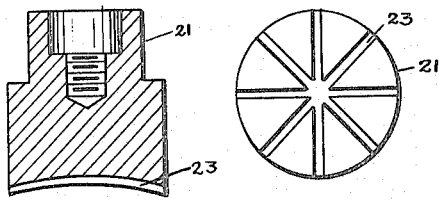
FIG. VI    FIG. VII
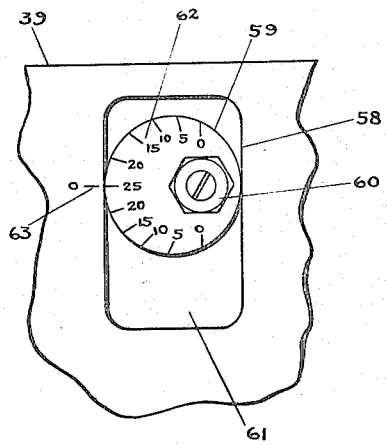
FIG. VIII
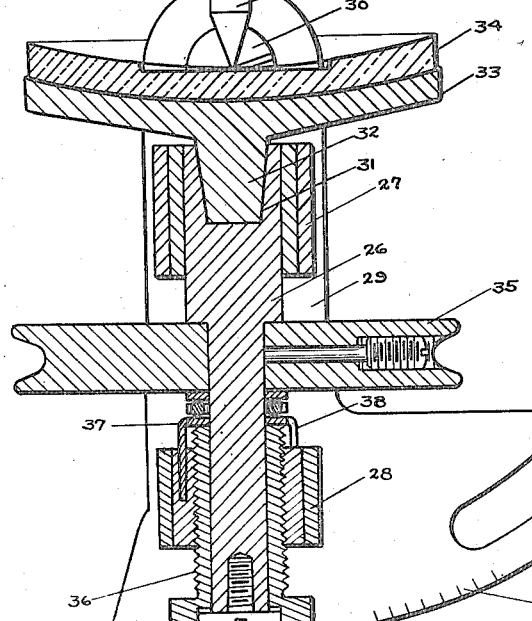
FIG. V
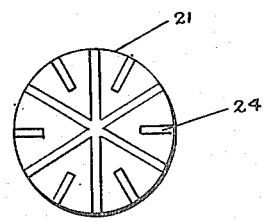
FIG. IX
INVENTOR
HARRY W. HILL
BY
H. H. Styll & H. H. Parsons
ATTORNEYS Nov. 18, 1924.                                           1,515,681
                    H. W. HILL
                   LENS GRINDER
             Filed May 2, 1919            4 Sheets-Sheet 4
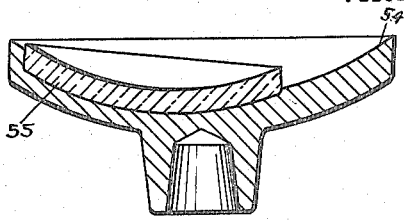
FIG. XIII
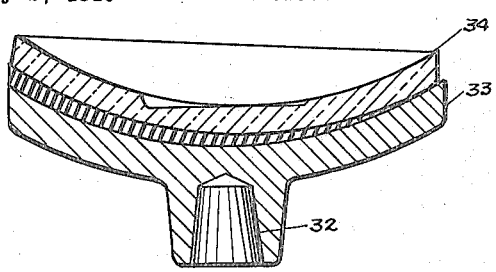
FIG. X
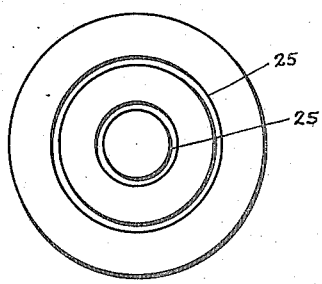
FIG. XIV
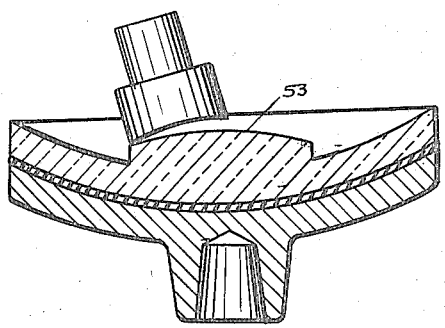
FIG. XI
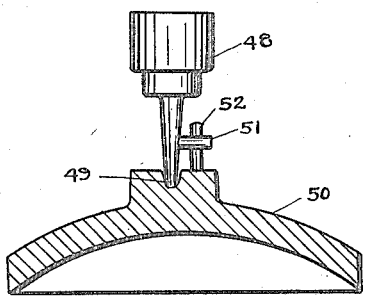
FIG. XV
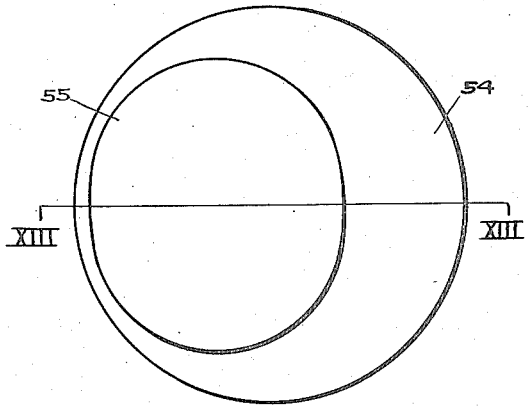
FIG. XII
INVENTOR
HARRY W. HILL
BY
H. H. Styll & H. H. Parsons,
ATTORNEYS Patented Nov. 18, 1924.

1,515,681

UNITED STATES PATENT OFFICE.

HARRY W. HILL, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS GRINDER.

Application filed May 2, 1919. Serial No. 294,172.

*To all whom it may concern:*

Be it known that I, HARRY W. HILL, a citizen of the United States, residing at Southbridge, in the county of Worcester and State of Massachusetts, have invented certain new and useful Improvements in Lens Grinders, of which the following is a specification.

This invention relates to improvements in lens making machinery and has particular reference to mechanism for placing desired surfaces for vision purposes upon glass or the like.

One of the principal objects of the present invention is the provision of a novel, inexpensive but accurate machine for the formation of lens curves.

Inasmuch as one of the most difficult problems met in connection with lens grinding is the formation of the central or reading portion of a bifocal lens blank in which during the formation of the lens two curves are formed on a single piece of glass, and since my machine while capable of various other uses is particularly useful for the purpose just mentioned, I have illustrated it in the drawings as employed for the formation of such surfaces.

In the manufacture of bifocal lenses there are many considerations to be taken into account. If that of appearance only were to be considered, in the greater majority of cases the line of joinder between the reading portion and the distance portion of a bifocal lens would be made to merge, in which case the lenses would be so ground that the centers of the two curves forming respectively the distance and the reading portion would fall on the same axial line.

There are numerous cases, however, which require the careful adjustment of the centers of the reading and distance portions to fall within certain required distances of each other. It may, therefore, be necessary to produce this bifocal to tilt the curve of the reading segment with respect to that of the distance portion. If this is done the centers of the two portions will not fall on the same axial line but their radii will be eccentric. Also it may be desired to converge the lines of vision so that at the ordinary reading distance the refraction of the lens will converge while the eye is looking normally straight ahead. This is done by tilting the reading segment so that the thicker portion or the prism is formed with its base on the nasal side of the lens. It is one of the primary objects of my invention to provide a machine which is universally adaptable to grind bifocal lenses fulfilling all or any of the desired purposes.

There are also two general methods of grinding or producing lenses which may be broadly divided as generative grinding and lap grinding. Where a curve is generated the curvature produced is not dependent on the shape of the tool. In lap grinding the curve produced is dependent on the shape of the tool. My invention is capable of being used with either type of grinding and with various kinds of tools.

A further object of the present invention is the provision of an improved type of machine which may be satisfactorily employed for the formation of desired curved surfaces, such as the minor portion of a bifocal lens blank, for example, in which the formation of such surface is through what is commonly known as the generative process; that is to say, in which the ultimate curvature or focal value of the surface is primarily dependent upon the point of intersection of the axis of the upper and lower spindles.

Another object of the present invention is the provision of a novel and improved machine which will satisfactorily produce bifocal lenses in which the reading portion while of spherical form is tilted at an angle to the general curve of the major or outer portion of the blank or piece of glass being ground so that the optical center of said reading portion may be positioned at any desired point.

A further object of the present invention is the provision of a novel and improved machine in which an ordinary ground and finished spectacle lens or the like may be satisfactorily mounted and a bifocal additional portion readily formed on the said finished lens.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a side elevation of one embodiment of my machine.

Figure II represents a front view thereof.

Figure III represents a vertical sectional view.

Figure IV represents a fragmentary view illustrating one method of applying the grinding pressure to the spindle.

Figure V represents an enlarged detail view partially in section of the lens holder or block spindle and adjacent parts.

Figure VI represents a detail sectional view of another form of tool adapted for use in connection with my machine.

Figure VII represents a bottom plan view of the tool in question.

Figure VIII represents a detail view of a transverse adjustment attaining and measuring device.

Figure IX represents a bottom plan view of a different form of tool adapted for use in connection with my machine.

Figure X represents a sectional view of a pronouncedly tilted lens and block therefor.

Figure XI represents the use of my machine in grinding a raised or projecting in place of countersunk portion.

Figure XII represents a plan view of a lens and block for use when a finished lens is to have a bifocal portion formed thereon.

Fig. XIII is a sectional view as on the line XIII—XIII of Figure XII.

Figure XIV is a bottom plan view of another form of grinding tool.

Figure XV represents a vertical sectional view of one form of polisher adapted for use on my machine.

In the drawings, in which similar characters of reference are employed to denote corresponding parts throughout the several views, the numeral 1 designates the base of my machine, having rising therefrom the standard 2, terminating in the forwardly curving arms 3 and 4, provided with the bearing portions 5 and 6 for the upper grinding spindle 7 which is vertically slidable through the bearings 5 and 6 as through the medium of the shift collar 8 rotatably supported on the shaft 7, as by the retaining collars 9, and having the laterally projecting pins 10 engaged by the arms of the shift yoke 11. This shift yoke 11 is preferably pivoted as at 12 to the standard 1 and has operatively associated therewith the shift lever 13, capable of either manual operation by grasping the handle 14, or automatic operation as by suitable adjustment of the weight 15, allowing the arm to apply pressure through the yoke 11 to the grinding spindle. As an alternative form of construction in place of the weight I may make use of the spring 16 having one end secured to the standard 1 and the other end adjustably connected, as by the rod 17 and nut 18, with the yoke or arm to apply a yielding pressure downward toward the spindle. In those forms in which the weight is employed I may if desired make use of the spring 19, having the opposite ends operatively associated with the standard 1 and with the shift yoke to tend to raise and hold the parts in raised position when the hand is disengaged from the handle 14 or the weight removed or shifted into inoperative position.

In any event the shaft 7 has splined or suitably operatively associated therewith the drive pulley 20 positively rotating its upper spindle and bears at its lower end a grinding tool as 21, which grinding tool may be of any desired form, such as for example the forms illustrated in detail in connection with Figures III, VI, VII and IX. In the form illustrated in Figure III the tool is shown as of the ring or annular type having merely the ring portion or surface 22 for operative engagement with a lens. On the other hand, in Figure VI, I have illustrated a tool of the lap type transversely curved according to the curve which it is desired to produce or form on the lens, the grinding surface of this tool, however, being preferably provided with the series of grooves 23 which will receive and to a certain extent hold the abrasive and will facilitate the feeding in or flow of the abrasive to the central portion of the tool during grinding. A similar arrangement of grooves is also illustrated in Figure IX, with the addition of the supplemental shorter grooves 24, while in Figure XIV, I have shown a form of my tool in which circular grooves 25 are provided.

It is to be understood that I can, of course, if preferred make use of an ordinary plain surface lap, diamond charged lap or the like as well as the specific forms of tools illustrated, but these are believed to possess certain advantages over other forms of tools. The operation of the ring tool is old and well known in the art, in that a ring surface such as the flange 22 will fit any spherical curve, in theory the contact being only on a single circular line and the curve produced in the case of a rigidly held ring tool depending entirely on the point at which the axis of rotation of the lens and tool spindles intersect, it being understood in connection with this condition that both the lens and tool are rigidly held with respect to their spindles. Under these conditions the curve produced will always be a curve having as its center the point of intersection referred to. This is what is known as the generative principle and is the principle of operation of my present machine. This principle of generation, however, is not dependent upon the use of a ring tool but applies equally as well whatever the form of tool employed may be, since with two rigidly held surfaces rotating about intersecting axes lying in a common plane, the curve produced will be a spherical one having as its radius the distance from the point of intersection of the two axes of rotation to the point of intersection of the two surfaces. Therefore, if the parts are properly adjusted and the grinding be done with a diamond charged or other extremely durable lap a plain form of lap may be used.

Similarly, if it is desired to do the grinding with a soft iron or other grinding lap the same principle will hold. The only difficulty to be here considered is that in the formation of a bifocal central portion or reading portion of the lens the curve to be produced is to be a more positive curve than that already on the lens, which means that more grinding is to be done at the outer edge or circumference than is to be done at the center. This means that in the ordinary adjustment of the machine if the tool be a surface contact tool the grinding begins at the edge of the tool and must grind into the glass an appreciable amount before the central portion of the tool will be brought into contact with the glass.

I have, therefore, especially designed the forms of my tool shown in Figures VI, VII, IX and XIV with this in view. That is to say, in the form of tool shown in Figures VII and IX for example, I have provided a plurality of transversely extending feed grooves in the surface of the tool which are quite advantageous in assisting in the maintenance of a proper supply of abrasive material to the entire surface of the tool. These, however, possess an additional advantage in that while a relatively small portion of the material is removed from the periphery of the tool a relatively large portion of the material is removed from the center of the tool. It will thus be seen that the relative resistance of the outer and inner portions to wear has been increased in favor of the outer portion and by proper calculation this may be so adjusted that the wear of the tool during grinding will be substantially uniform so that the tool will most satisfactorily hold and maintain its shape during the entire grinding operation and the proper surface be generated on the lens in the most economical manner.

I have previously referred to the fact that the curvature to be produced is dependent upon the angle of intersection of the two axes which lie in a common plane. By reference to Figure III it will be noted that the upper spindle 7 is in axial alinement with the lower spindle 26 which is held in the bearings 27 and 28 of the adjustable frame plate 29, the frame plate 29 being angled or tilted about the pivot 30 to maintain the two spindles in the same plane but vary their angular relationship. The spindle 26 is provided at its upper end with a socket 31 to receive the stud or shank 32 of the block 33 for the lens 34, and in addition has secured thereon the pulley 35 by which the spindle may be driven. In addition this spindle is vertically adjustable by means of the adjusting sleeve 36 in threaded engagement with the bearing 28 and serving to press upwardly against the thrust bearing 37 having the depending portions 38 engaging the bearing 28 to prevent frictional rotative movement being transferred from the bearing to the adjacent screw 36.

As it is essential for the production of lens surfaces by the generative method that the point of intersection of the spindle axes remain constant during the grinding operation and be capable of accurate determination, I provide the frame plate 29 and adjacent portion of the slide 39 with the vernier scale members 40 by which the exact amount of angling of the plate 29 with respect to the remainder of the machine may be determined, while by the use of a suitably laid out chart the intersection and curve produced by this particular angling in connection with the other adjustments of the machine may be accurately determined. Any suitable means may be employed to lock the plate 29 in desired adjusted position, a conventional means including the arcuate slot 41 and the clamping bolt 42 being illustrated in the drawings.

It will be understood that the more accurately related the several parts of the machine and the less variables to be considered in setting of the same, the more readily it may be adjusted to secure any particular desired curvature. I would, therefore, call particular attention to the fact as illustrated in connection with Figure II, that the machine is so set that the upper and lower spindles are out of vertical alinement with each other, though lying in a common transverse vertical plane, the relative lateral displacement being such that the right hand edge of the tool in Figure II extends axially to the axis of the lower spindle. In addition the glass blank is so adjusted, as shown in Figure V, that at the axis of its spindle the surface of the glass is in exact horizontal alinement with the center of pivotance of the lower frame, which center of pivotance is also in the axial plane of the lower spindle at right angles to the direction of angling. The result of this is that irrespective of the angling of the lower spindle or its rotation the center point of the glass will remain in a certain fixed position and will be in nowise raised, lowered or otherwise shifted by the angling or rotating of the spindle. This exact positioning of the glass is attained through the use of my improved gauge member comprising the rod 43 slidable in the standard 2 of the frame and provided with the gauge point 44. The gauge, as is indicated in Figure III, may be withdrawn out of the way when not in use but when in use is brought forward and turned to bring the point vertical, when the point will assume a position directly over an axis extending from the pivot 30 and is pressed inward to assume a position directly in line with an axis extending axially upwardly from the axis of the lower spindle 26. With the gauge in this position the adjacent sleeve 36 may then be rotated to bring the glass just into contact with the point, when the parts will be properly set for the subsequent grinding. For this calibration the lower spindle is preferably in a vertical position and at this point the upper spindle 7 should be depressed until the tool at its inner edge engages the same point on the glass that was previously engaged by the member 44. With the parts in this position the stop 45 at the upper end of the spindle is turned to bring the splined washer 46 thereof just into contact with the upper end of the stop flange 47 on the bearing 5. The lower spindle is then angled as desired and the grinding operation proceeded with.

In ordinary grinding the wear of the tool in producing a single reading surface should not be appreciable, and in the absence of undue wear the tool will grind a suitable reading portion onto the blank cutting into the lens at the outer edge of the reading portion and grinding down just to the center of the reading portion, which should remain its original height. At the completion of this operation the lens block and blank can be readily removed from the machine and tested to determine if the curvature is absolutely correct and the surface in suitable condition for polishing. Should there be any defect found in the surface the blank may be returned to the machine and the lower spindle given a minute upward adjustment or the upper spindle a minute adjustment, allowing it to fit downward lower, dependent on whether the defect appears due to a slight wear of the tool or whether it is entirely a surface defect, in which a slight further amount of glass should be removed to eliminate the same.

The lens having been thus ground it may then be polished by any suitable mechanism, being preferably transferred to a different machine for this purpose, although if desired I may remove the tool 21 and substitute in its place the drive member 48 having the cone point 49 adapted to engage the polisher 50. This polisher 50 can either be allowed to idle upon the cone point, when it will be rotated by relative friction between the rotating glass and polisher, or it may be rotated by the laterally projecting pin 51 on the member 48 engaging with the upstanding drive pin 52 of the polisher or other suitable inter-engaging driving connection may be made use of as desired.

In the event that it is desired to produce a tilted countersink in the blank being operated upon it is merely necessary to support the main blank tilted with respect to its holder as the chord of the final surface produced will always be at right angles to the axis of the holder and its spindle. A tilted blank for this purpose is illustrated in connection with Figure X and Figure XII. The purpose of this tilting of the blank is to introduce a prismatic effect in the segment, as for example to counteract a strong prismatic effect which might otherwise be present, or to suitably form the blank for convergent work or the like. Similarly, while I have referred to my machine as particularly adapted to countersink the segment into the blank it will be understood that it is equally applicable in the event that the outer portion of the blank is first ground away to leave a projecting segment or reading portion 53 on the blank as is shown in Figure XI, for example.

In those cases where it is desired to grind a finished lens from a small piece of glass with the segment I may make use of one of my improved holders, as shown in Figures XII and XIII, the holder 54 in this case having formed in it a sunken portion or recess 55 of substantially correct size and shape to receive the piece of glass to be ground, so that the remainder of the holder will extend upwardly somewhat thereabove, the recess being preferably about half the thickness of the glass. This possesses two advantages; first that the glass may be most accurately placed within the holder, and also by the formation of this recess any tendency toward lateral slipping of the glass is prevented and the lens holder or block with the glass on it is satisfactorily balanced so that there will be no unbalanced centrifugal action taking place during the grinding operation.

In connection with Figure II, I have called attention to the fact that the right hand edge of the tool was in exact alinement with the center of the lower spindle. In the event that all segments ground on the machine are to be of a single size it is not necessary that there be any relative cross adjustment of the parts of my machine. In the event, however, that different sized segments are to be ground it is necessary to make use of different diameters of tools, it being understood that in all cases the diameter of the segment ground is twice the diameter of the tool employed, in that the tool in all instances extends from center to edge of the segment. To take care, therefore, of different sizes of tools I preferably mount the pivot 30 in the slide plate 39 which moves in suitable guides on the standard 1 and may be locked in transversely adjusted position as by the clamp bolts 56. Suitable designations may be provided, as the vernier scale 57, for indicating this relative transverse adjustment of the parts, or in place of this scale I may secure to the standard 2 the bolt 58 having rotatably mounted thereon the eccentric bushing 59 provided with the hexagonal head or the like 60 to facilitate its rotation, this bushing being adapted to fit in the elongated slot 61 formed in the slide plate 39 and being provided with the suitable graduations 62. Loosening of the bolt 58 will permit of rotation of the bushing which fits the sides of the slot 61 and serves as a cam to force the slide plate laterally or give it a transverse movement in its guides, the graduations on the cam or eccentric bushing being adapted to register with the points 63 on the slide 39 to indicate the amount of transverse adjustment given the slide through this means, while tightening of the pivot 58 will tend to lock the eccentric or cam adjusting device and thus the slide plate in desired adjusted position according to the size of tool which is to be employed in the grinding.

It will, of course, be understood that angling of the lower spindle toward the left, as illustrated in Figure II, will produce convex curves while angling toward the right will produce concave curves, the parts being always kept to the right of the spindle. Also it will be understood that if in place of substituting a larger tool the slide 39 and parts be given a transverse adjustment and the same size tool employed that a spherical zone would then be ground on the lens with an unground central portion, the power to be produced in the zone being readily determined after consideration of the amount of transverse and of angular adjustment given the lower spindle in a particular instance.

If desired to further lock the adjusting sleeve 36 in desired position I may make use of a set screw or equivalent locking device 56 carried by the bearing 28 and adapted to engage said sleeve.

From the foregoing description the construction of my improved machine and its operation should be readily understood, and it will be seen that I have provided an improved machine of the generative type in which the upper spindle is rigidly held for vertical movement only, which vertical movement can be accurately limited as desired, and in which the surface of the glass at its center may be brought to a predetermined point and the glass with its spindle rotated or tilted as desired about that point, which point also corresponds with the position to which the edge of the operating tool is to ultimately reach, and that by these adjustments I am able to produce an extremely accurate machine which will positively generate any desired curve according to the particular adjustment given and in which on account of the calibrations referred to a minimum quantity of glass will be required to be removed, a minimum depth of ridge will be formed on the glass and the lens thus produced will be of maximum satisfaction for the particular type intended, both as to appearance and as to optical desirability and will be produced at a minimum of expense compatible with the high character of results obtained.

I claim:

1. A machine of the character described, comprising a frame, upper and lower spindles carried thereby, a lens carried by one spindle and a grinding tool carried by the other of said spindles, a bracket for supporting said holder carrying spindle, a gauge associated with the frame, means for forcing the lens into engagement with the gauge and for locking it in such adjusted position, a thrust bearing on the lower spindle, means for locking a portion of the thrust bearing against rotative movement while permitting of longitudinal movement thereof, said forcing means comprising an adjusting sleeve surrounding the spindle for engaging the thrust bearing, said adjusting sleeve having threaded engagement with the bracket whereby rotation of the sleeve will shift the bearing and spindle to various positions.

2. In a lens surfacing machine, a frame, tool and lens carrying spindles operatively mounted in said frame, one of said spindles having an angular adjustment about an axis to determine the curvature of the lens and which intersects the axis of one spindle, a gauge pointer mounted to be adjustable toward and from the latter axis and having a gauge contact locatable in the first axis and capable of being swung out of the way, and means manually actuated for moving one of said spindles axially toward and from the other spindle to contact with the gauge pointer.

3. In a lens surfacing machine, a frame, tool and lens carrying spindles operatively mounted in said frame, the lens carrying spindle having an angular adjustment about an axis to determine the curvature of the lens and which intersects the axis of the tool carrying spindle, a gauge pointer mounted to be adjustable variably toward and from the latter axis and having a gauging contact locatable variably in the first axis, and capable of being swung out of the way, and means manually actuated for moving said lens carrying spindle axially toward and from the tool carrying spindle to contact the lens with the gauge pointer.

In testimony whereof I have affixed my signature, in presence of two witnesses.

HARRY W. HILL.

Witnesses:
 ESTHER M. LAFLER,
 H. E. COLEMAN.